(12) United States Patent
Dressler et al.

(10) Patent No.: US 9,160,558 B2
(45) Date of Patent: Oct. 13, 2015

(54) COMMUNICATION SYSTEM AND INTERFACE DEVICE FOR A COMMUNICATION SYSTEM

(75) Inventors: Marc Dressler, Horn (DE); Thorsten Hufnagel, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 916 days.

(21) Appl. No.: 13/032,285

(22) Filed: Feb. 22, 2011

(65) Prior Publication Data

US 2011/0145454 A1    Jun. 16, 2011

Related U.S. Application Data

(63) Continuation of application No. PCT/EP2008/007194, filed on Sep. 3, 2008.

(51) Int. Cl.
  *G06F 13/12* (2006.01)
  *G06F 13/38* (2006.01)
  *H04L 12/40* (2006.01)

(52) U.S. Cl.
  CPC .............................. *H04L 12/40032* (2013.01)

(58) Field of Classification Search
  USPC ......................................................... 710/106
  See application file for complete search history.

(56) References Cited

U.S. PATENT DOCUMENTS

| 4,263,650 | A | * | 4/1981 | Bennett et al. .................. 710/31 |
| 6,073,205 | A | * | 6/2000 | Thomson ...................... 711/100 |
| 6,324,605 | B1 | * | 11/2001 | Rafferty et al. ............... 710/100 |
| 6,549,966 | B1 | * | 4/2003 | Dickens et al. ............... 710/300 |
| 6,701,377 | B2 | | 3/2004 | Burmann et al. |
| 7,793,017 | B2 | * | 9/2010 | Gehring et al. .................. 710/63 |
| 2003/0233407 | A1 | | 12/2003 | Khavrov et al. |
| 2005/0060439 | A1 | * | 3/2005 | Duncan et al. .................. 710/15 |
| 2007/0156253 | A1 | | 7/2007 | De Silvio |
| 2007/0226381 | A1 | * | 9/2007 | Kuan et al. ...................... 710/16 |
| 2008/0004726 | A1 | | 1/2008 | Gehring et al. |
| 2008/0065239 | A1 | | 3/2008 | Leinfellner et al. |
| 2009/0319059 | A1 | * | 12/2009 | Renfro et al. ................... 700/30 |

FOREIGN PATENT DOCUMENTS

| DE | 197 39 297 C2 | 11/2001 |
| DE | 10 2005 051 643 A1 | 4/2006 |
| DE | 10 2005 051 673 A1 | 5/2007 |
| EP | 1 349 073 A1 | 10/2003 |
| WO | WO 2005/091089 A1 | 9/2005 |

OTHER PUBLICATIONS

Chinese Office Action for Chinese Application No. 200880130860.X dated Apr. 2, 2013—English translation.

* cited by examiner

*Primary Examiner* — Elias Mamo
(74) *Attorney, Agent, or Firm* — Muncy, Geissler, Olds & Lowe, P.C.

(57) ABSTRACT

A communication system is provided that includes at least two peripheral devices, wherein each peripheral device has at least one I/O interface and the peripheral devices are connected to each other by at least one data bus and exchange data by means of a communication relationship via the data bus. At least one interface device has a peripheral device interface and has a data bus interface, the interface device being connectable by the peripheral device interface thereof to one of the peripheral devices via an I/O interface thereof, and the interface device being connected by the data bus interface thereof to the data bus, and the communication relationship can be preset in the interface device.

20 Claims, 4 Drawing Sheets

COMMUNICATION SYSTEM AND INTERFACE DEVICE FOR A COMMUNICATION SYSTEM

This nonprovisional application is a continuation of International Application No. PCT/EP2008/007194, which was filed on Sep. 3, 2008, and which is herein incorporated by reference.

BACKGROUND OF THE INVENTION

1. Field of the Invention

The present invention relates to a communication system comprising at least two peripheral devices, whereby each peripheral device has at least one I/O interface and the peripheral devices are connectable to one another by at least one data bus and exchange data via a communication relationship via the data bus. Further, the invention also relates to an interface device for connecting at least one peripheral device with an I/O interface to a data bus.

2. Description of the Background Art

Communication systems of the aforementioned type have been known for a long time and are used inter alia frequently in control device development and the development of communication systems with the use of control devices. Control device development is also understood to include the development of control device functions in control device hardware invariable per se. Particularly, in the automotive environment, the number of the involved control devices, sensors, and actuators as peripheral devices and the functionalities realized by the hardware increase tremendously and with them the complexity of such communication systems increases greatly. The communication systems in question make it possible first of all that a plurality of peripheral devices are able to communicate with one another, namely can exchange their data in a predefined, and predefinable, manner and are thus able to handle and to realize extensive and networked tasks in distributed systems.

As indicated, peripheral devices may have a very different complexity. Thus, in simple cases, peripheral devices can be a simple sensor, which determines a measured variable and passes it on via the data bus, or it can be an actuator, which converts a datum, a correcting variable, obtained via the data bus into a corresponding output quantity. More complicated peripheral devices can be control devices, therefore "microcomputers," which handle more complex automation technology tasks independently and are connected via process interfaces, possibly indirectly via other sensors and/or actuators, to the process to be controlled. Further, a peripheral device may be any combination of the described devices. So that these peripheral devices can communicate via their I/O interface by means of the data bus, it is absolutely necessary that the I/O interfaces all meet the standard used as the basis for the data bus overall.

The data bus in many automation technology applications comprises fieldbuses with a completely different specification, which generally comply with a serial data transmission according to the international standard IEC 61158 for "Digital Data Communication for Measurement and Control—Fieldbus for Use in Industrial Control Systems"; it is not a matter of conformity with this standard in the present case, but the fact that all participating peripheral devices must meet a uniform standard is important, so that communication for the purpose of data exchange can occur via the data bus and the I/O interfaces of the peripheral devices. Typical fieldbus standards in the automotive sector are, for example, CAN (Controller Area Network), but time-deterministic serial bus protocols such as TTP (Time Triggered Protocol) or FlexRay are also used increasingly.

Particularly, in the development and the associated testing of automotive systems, the developer faces a number of applications in which the use of a communication system or the adaptation of an existing communication system is virtually not possible or possible only with considerable effort. It occurs, for example, that during the development of a control technology solution to an automation problem, work is performed for a long time not with the peripheral devices that are ultimately used in the series solution, but rather work is performed with peripheral devices in development, which have only part of the equipment of the serial peripheral device, particularly no data bus interface. This scenario is known, for example, from the field of automotive problems, where development control devices are used that do not have the I/O interfaces to be used later in the series solution or that have no I/O interfaces suitable for making a direct connection to a data bus for communication with other peripheral devices.

In other applications, the peripheral devices do have an I/O interface, by means of which a connection to a data bus can be created but this I/O interface is already in use and cannot be employed further for additional tasks. Frequently, an existing communication system should also not be changed as much as possible, existing communication relationships between peripheral devices should not be changed, or this is also not possible because the appropriate development tools are not available.

SUMMARY OF THE INVENTION

It is therefore an object of the present invention to provide a communication system with which at least the indicated problems related to the prior art can be solved.

In an embodiment, the communication system of the invention includes at least one interface device having a peripheral device interface and a data bus interface. The interface device is connectable by the peripheral device interface thereof to one of the peripheral devices via the I/O interface thereof, and the interface device is connectable by the data bus interface thereof to the data bus and the communication relationship can be preset in the interface device.

It is possible with the communication system of the invention via the provided interface device to integrate peripheral devices into a communication system, whose I/O interface first of all is not at all intended and also not designed to provide a connection to a data bus; this task is assumed by the interface device, which, on the one hand, by means of its peripheral device interface enables a data exchange with the peripheral device via the I/O interface of the peripheral device and, on the other, by means of its data bus interface allows a communication connection to the data bus. A communication system, which operates with interface devices of this type, can be used very flexibly, because an absent, or already engaged, functionality for communication via a data bus is made available here completely new, or in addition, via the interface device. It is always a requirement that the appropriate peripheral device also has a still accessible and not otherwise engaged I/O interface; this is frequently the case in practice, however.

An exemplary embodiment of the communication system of the invention includes a configuration device with a data bus interface and the configuration device is configured so that the communication relationship can be transmitted with it via the data bus interface and the data bus to the interface device. An additional interface for programming the interface device becomes superfluous due to the connectivity of the configuration device by means of the data bus interface to the data bus, and by means of the data bus via the data bus interface of the interface device to the interface device. The configuration device is used preferably not merely for transmitting the communication relationships to the particular participant or interface devices. Rather, it also comprises software tools that visualize the hardware configuration of the entire communication system, precisely like the functionality to be implemented overall with this hardware in the form of software components, and allows an assignment of these hardware and software components to one another. In another exemplary embodiment, the communication relationship can be designed as a k-matrix according to the AUTOSAR standard (AUTomotive Open System ARchitecture).

Another embodiment of the invention provides that the relevant communication relationship (KV), in addition or alternatively, can be transmitted from a connected peripheral device via the peripheral device interface to the interface device or can be obtained by the interface device from the peripheral device, so that the interface device is readily able, for example, to load a communication relationship stored alternatively in the peripheral device or also, for example, to update a communication relationship newly reaching the peripheral device through an update in the interface device as well.

According to another embodiment of the invention, the configured interface devices assure a data exchange between the peripheral devices, namely particularly without another interconnection or connection of the configuration device being necessary. In this case, the communication relationship stored in the respective interface device includes all information necessary for the targeted data exchange. This refers, for example, to at least one memory location of the peripheral device which is connected via the peripheral device interface and from which data are to be read and/or in which data are to be written. The communication relationship can also include the specification of a peripheral device connected by the data bus interface, from which data are to be obtained via the data bus and/or to which data are to be transmitted via the data bus. When the point is that a memory location in a peripheral device belongs to the communication relationship, then in this case this can also be a symbolic identifier of the memory location and optionally a memory area; the specification should not be understood narrowly in terms of an absolute address within a memory.

In an alternative embodiment of the invention, a configuration device with a data bus interface is provided, whereby the configuration device according to the preset communication relationships, stored in the configuration device itself, queries data via the data bus from the peripheral devices via the interface devices and outputs these data and/or calculated data according to the preset communication relationships via the data bus to the peripheral devices. The read-out data need not be identical to the output data; rather in the configuration device a calculation can also occur based on the read-out data, e.g., within the scope of a control algorithm, the result values of this calculation being output. A function bypassing can also be realized, for example, in this way. In this case, the configuration device can be used practically as a communication center, and the communication relations implemented in the interface device can be limited, for example, to the information affecting the peripheral device, therefore, for example, comprise the memory location from which data are to be read in the peripheral device or in which data are to be stored in the peripheral device.

Especially advantageously, the communication system of the invention can be used when the peripheral device interface of the interface device corresponds to the debug interface of a control device, because many control devices used as peripheral devices, particularly for development purposes, have such a debug interface. Such debug interfaces are not intended to create a connection to a data bus, but according to the invention, they are used for access to the peripheral device via the interface device. Typical debug interfaces are known under the names JTAG, DAP, AUD, or Nexus.

Debug interfaces have the advantageous property that the computer system—peripheral device—accessible via the debug interface can be observed and affected via the debug interface virtually non-intrusively by reading or writing in the memory areas of the peripheral devices via the debug interface; no separate software-based instrumentation of the peripheral device is necessary. Many control devices used as peripheral devices in the development version do not have data bus interfaces as an I/O interface provided later in the series control device, but in any case they often have a debug interface as an I/O interface, because this interface is especially helpful, particularly for the development time, therefore for the pre-production product, and necessary for troubleshooting, therefore also the name "debug" interface.

In another embodiment of the invention, the peripheral device interface of the interface device can be formed so that it utilizes an I/O interface of the peripheral device, which enables direct access to the internal data bus of a control device. Such interfaces are realized on the part of the peripheral device, for example, by a dual-port memory (DPMEM), which is connected directly to the address bus and data bus of the microcontroller or processor of the peripheral device. In contrast to the use of a debug interface, a software-based instrumentation of the peripheral device is necessary in this variant, however, so that the data of interest can also be exchanged in fact via the dual-port memory with the interface device and stored there.

The interface device used in the communication system in another embodiment of the invention, alternatively or in addition as well, has a sensor interface and/or an actuator interface, with which sensors and/or actuators as well can be integrated into the data bus communication by means of the interface device, e.g., when the sensors or actuators have standardized sensor/actuator interfaces as I/O interfaces.

In an embodiment of the invention, the peripheral devices, at least partially, are connected in addition directly to one another in a known manner via a standard fieldbus interface by a standard fieldbus, therefore without an interconnected interface device. Via the standard fieldbus interface, the peripheral devices therefore have a communication relationship, which may be left in an original state and within the scope of further development is not supposed to be changed further initially. In this case, an additional communication connection between the peripheral devices can be created via the additional I/O interface of the peripheral devices and via the interface device provided according to the invention, so that the communication system, realized by the interface devices of the invention, is parallel to the—original—communication system via the standard fieldbus interfaces and the standard fieldbus. As a result, an expansion of the communication options between the peripheral devices can be produced in a very simple and universal manner, which facilitates enormously the (further) development of systems of this type.

The object on which the invention is based is achieved according to a further embodiment of the invention by an interface device for connecting at least one peripheral device with an I/O interface to a data bus, whereby the interface device has a peripheral device interface and a data bus interface, the interface device is configured so that the interface device can be connected via the peripheral device interface thereof to at least one peripheral device by means of the I/O interface thereof and can exchange data with the peripheral device, and the interface device can be connected via the data bus interface thereof to the data bus, transmit and/or receive data via the data bus, and at least one communication relationship can be implemented in the interface device.

The interface device with the aforementioned properties is substantially suitable for setting up and operating the previously described communication system. Through the interface device of the invention, it is readily possible to supplement the existing peripheral devices with a bus functionality, namely without a change in the peripheral devices themselves being necessary, which is labor-intensive, associated with high costs, and moreover also prone to error. The interface device of the invention makes it possible in a convenient manner to connect distributed peripheral devices by means of a data bus, as long as these peripheral devices have at least one I/O interface.

The peripheral device interface of the interface device is configured so that it can access a debug interface of a control device, whereby the debug interface of the control device can be regarded as an I/O interface of a peripheral device. Alternatively or in addition, the peripheral device interface is configured so that it can access the internal data bus of a control device, whereby the I/O interface of the peripheral device formed as a control device can comprise, for example, a dual-port memory.

According to an embodiment of the invention, the data bus interface of the interface device is formed as a standard fieldbus interface, which makes it especially simple to connect additional components to the peripheral device via the interface device, when these additional components also have a standard fieldbus interface.

Interface devices are characterized by the fact the communication relationship stored in them is specified at least by one of the following items of information: at least one memory location of the peripheral device which is connected via the peripheral device interface and from which data are to be read and/or in which data are to be written, and/or at least one peripheral device which is connected via the data bus interface and from which data are to be obtained via the data bus and/or to which data are to be transmitted via the data bus. The type and scope of the data stored as the communication relationship can also depend on how the data bus interface is formed and which communication standard—protocol—is used for it.

Specifically, there are different options for forming and refining the communication system of the invention and the interface device of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
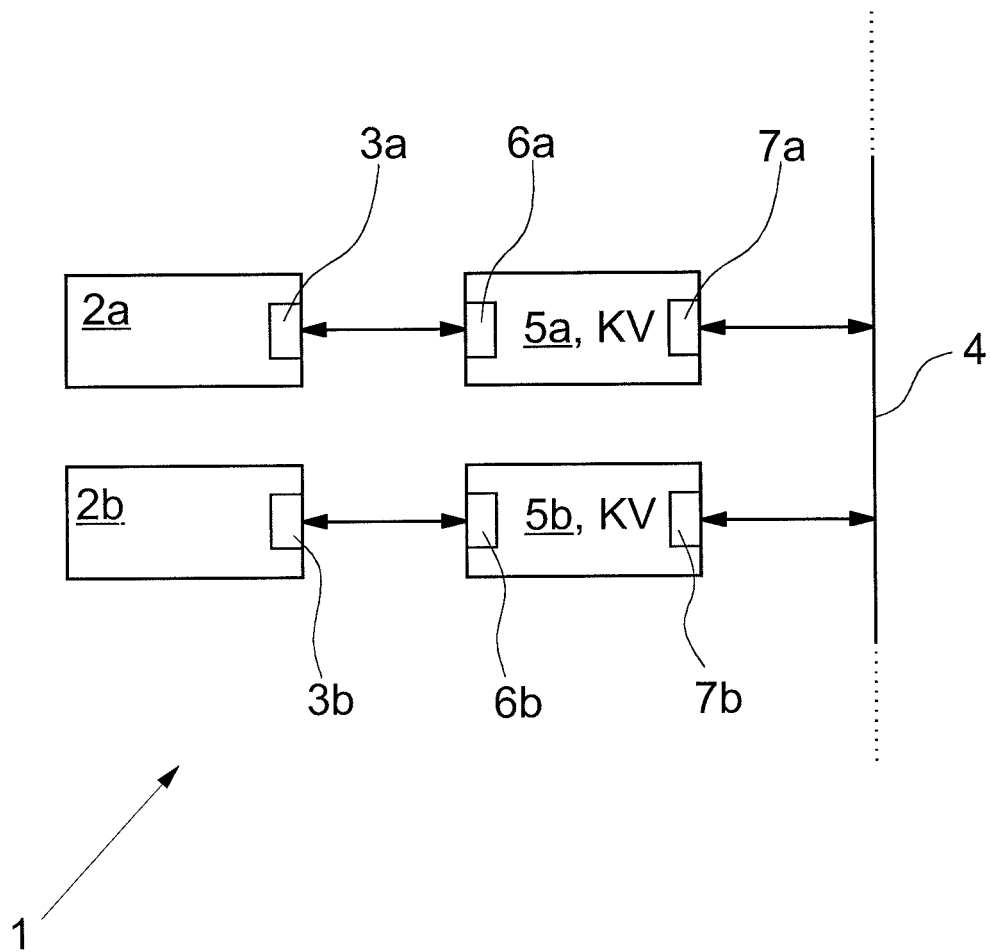
FIG. 1 shows a first exemplary embodiment of a communication system of the invention with interface devices of the invention.

A communication system 1 with a plurality of peripheral devices 2a, 2b, 2c, 2d is shown in FIGS. 1 through 4, whereby each peripheral device 2a, 2b, 2c, 2d has at least one I/O interface 3a, 3b, 3c, 3d. Peripheral devices 2a, 2b, 2c, 2d are connected to one another by a data bus 4 and can exchange data via data bus 4 according to a preset communication relationship KV. As is evident in FIG. 2 through peripheral device 2b and in FIG. 3 through peripheral device 2d, the data exchange can occur from peripheral device 2b or 2d directly with data bus 4 via I/O interface 3b or 3d. This is the known and conventional communication of peripheral devices 2b, 2d via data bus 4. In these cases, I/O interfaces 3b, 3d of peripheral devices 2b, 2d are already designed as data bus interfaces for data bus 4.

Communication systems 1 shown in FIGS. 1 through 4 are characterized in that at least one interface device 5a, 5b, 5c with a peripheral device interface 6a, 6b, 6c and with a data bus interface 7a, 7b, 7c is provided, interface device 5a, 5b, 5c is connected by peripheral device interface 6a, 6b, 6c thereof to one of the peripheral devices 2a, 2b, 2c by mean of I/O interface 3a, 3b, 3c thereof, and interface device 5a, 5b, 5c is connected by data bus interface 7a, 7b, 7c thereof to data bus 4, and the communication relationship KV can be preset in interface device 5a, 5b, 5c.

Figure 3:
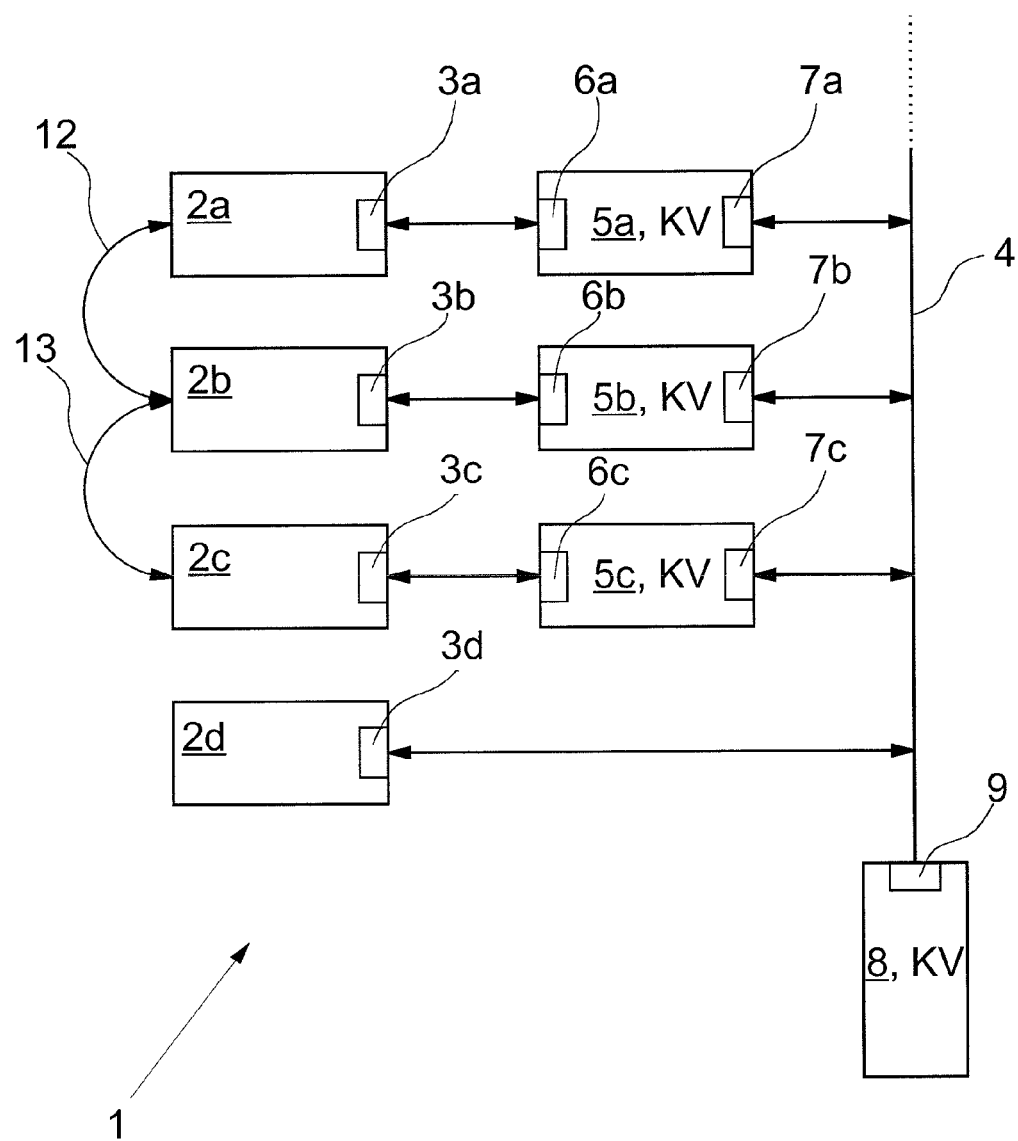
FIG. 3 shows another exemplary embodiment of a communication system of the invention with interface devices and a configuration device.

Peripheral devices 2a, 2b are control devices; the peripheral devices 2c, 2d shown in FIG. 3 are an actuator and a sensor.

It is advantageous in the shown communication systems 1 that peripheral devices 2a, 2b, 2c themselves need not have any I/O interface specific for data bus 4, but need to have only access by means of any I/O interface 3a, 3b, 3c. The functionality of the transmission of data from peripheral devices 2a, 2b, 2c to or from data bus 4 is present separately in interface devices 5a, 5b, 5c. This enables the implementation of a communication system 1 with distributed peripheral devices 2a, 2b, 2c, 2d via a data bus 4, said devices which are not equipped with an I/O interface suitable for data bus 4.

Figure 2:
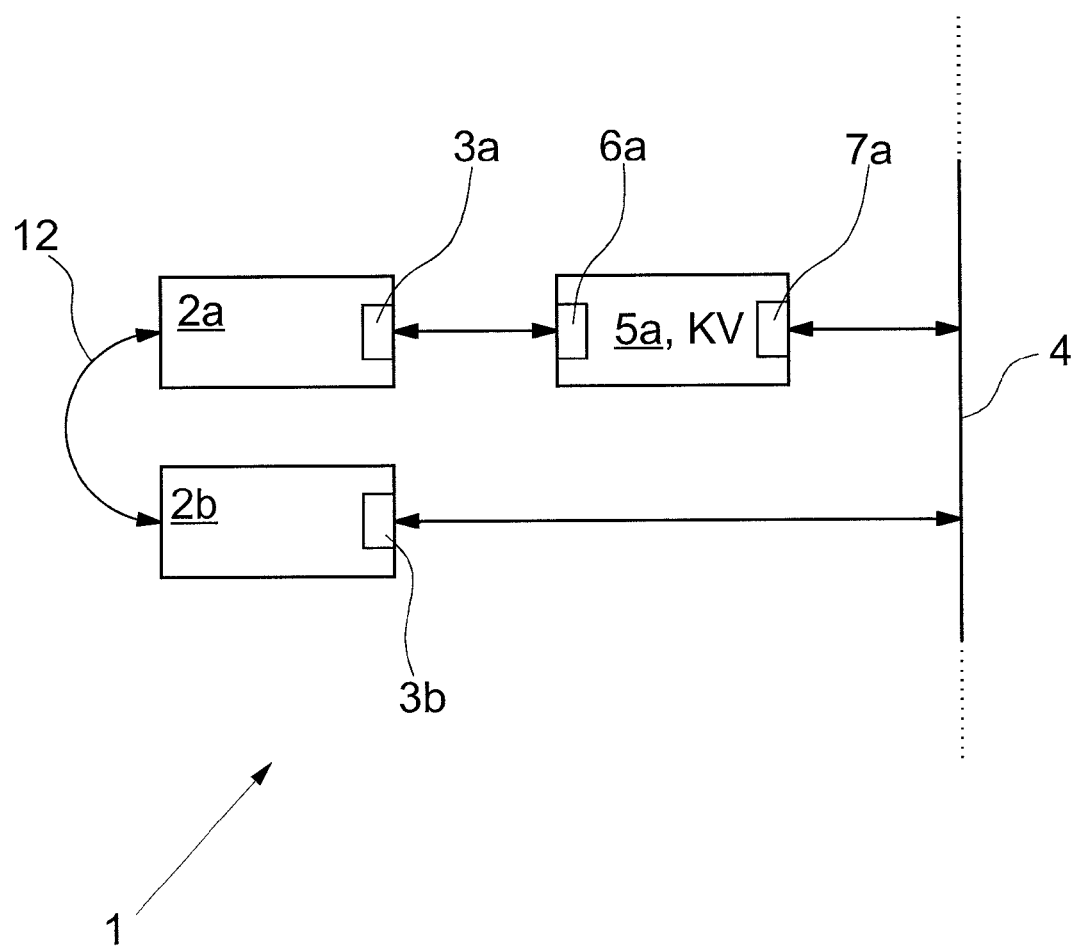
FIG. 2 shows another exemplary embodiment of a communication system of the invention with an interface device of the invention.

It can be seen in FIG. 1 that two peripheral devices 2a, 2b, which are control devices, are each connected to data bus 4 via an interface device 5a, 5b. As can be seen in FIG. 2, a communication system 1 of the invention, however, can also have only a single interface device 5a, which connects only one peripheral device 2a to data bus 4. In the exemplary embodiment shown in FIG. 2, peripheral device 2b is also a control device, which however has an I/O interface 3b, by which a direct connection to data bus 4 can be created.

Communication system 1 according to FIG. 3 has a configuration device 8 with a data bus interface 9, whereby configuration device 8 is configured so that the communication relationship KV can be transmitted by means of it via data bus interface 9 and data bus 4 to interface devices 5a, 5b, 5c. Communication relationship KV stored in the particular interface devices 5a, 5b, 5c contains all data necessary for an intended communication via data bus 4; in this respect, the communication relationships KV stored in interface devices 5a, 5b, 5c differ from one another, because they must describe in each case, inter alia, the individual communication related to the peripheral device 2a, 2b, 2c connected to respective interface device 5a, 5b, 5c.

Figure 4:
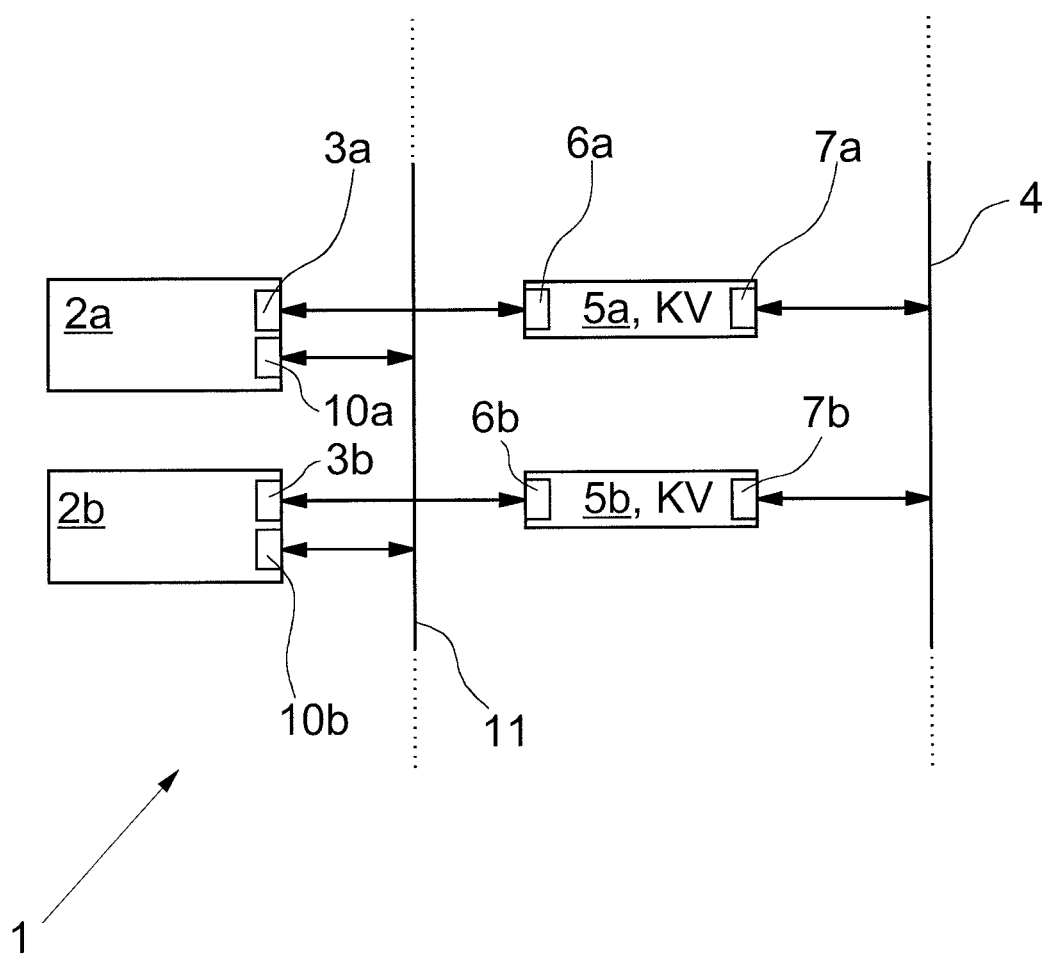
FIG. 4 shows another exemplary embodiment of a communication system of the invention with a parallel, conventional communication system.

Communication systems 1 shown in FIGS. 1, 2, and 4 have interface devices 5a, 5b configured in such a way that a data exchange between peripheral devices 2a, 2b is assured without further interconnection or connection of configuration device 8; for this reason, the configuration device is also not shown in FIGS. 1, 2, and 4. The communication relationships KV in these cases comprise information on the data or the memory locations within peripheral devices 2a, 2b, whose content is to be read out from peripheral devices 2a, 2b or in which data are to be written in peripheral devices 2a, 2b. In addition, communication relationships KV also comprise peripheral devices 2a, 2b to which these data are to be forwarded via data bus 4. Whether the information—the peripheral device 2a, 2b, 2c, 2d from which data are to be received by data bus 4—is important as well depends on the supported bus protocol or it can be used for communication monitoring; in the present case, this information is not covered by the communication relationships KV.

In communication system 1 according to FIG. 3, a configuration device 8 with a data bus interface 9 is provided, whereby configuration device 8 according to the preset communication relationships KV via data bus 4 queries data from peripheral devices 2a, 2b, 2c via interface devices 5a, 5b, 5c and outputs these data according to the preset communication relationships KV via data bus 4 to the respective peripheral devices 2a, 2b, 2c, and 2d. The communication relationships stored in interface devices 5a, 5b, 5c are limited only to the memory locations in peripheral devices 2a, 2b, 2c, from which data are to be read or in which data are to be written; information on communication partners need not be stored here, because configuration device 8 has this information.

All communication systems shown in FIGS. 1 through 4 are characterized in that data bus 4 is a standard fieldbus, which is why it is possible in an especially simple way to integrate additional peripheral devices in communication system 1, said devices which have this type of standard fieldbus interface. This relates, for example, to peripheral device 2b formed as a control device and shown in FIG. 2, and in FIG. 3 relates to peripheral device 2d formed as an actuator. In the shown exemplary embodiments, the standard fieldbus is the fieldbus which is based on the Ethernet standard and in which a data exchange is made by means of the XCP protocol (Universal Measurement and Calibration Protocol).

Peripheral devices 2a and 2b in FIGS. 1 through 4, as already mentioned, are control devices, whereby here in each case I/O interface 3a, 3b is a debug interface, which in the present case complies with the Nexus standard. Accordingly, peripheral device interfaces 6a, 6b are corresponding debug interfaces, which allow communication with peripheral devices 2a, 2b. This communication system 1 is of particular importance, because peripheral devices 2a, 2b in the form of control devices in the development phase in fact frequently have a debug interface, but not a standard data bus interface. Thus, a communication system 1 can nevertheless be produced via a standard data bus 4 with the use of a debug interface, in fact not intended for the implementation of a universal bus interface.

In FIG. 4, an especially interesting application of a communication system 1 is shown, in which peripheral devices 2a and 2b have a conventional communication relationship with one another via additional standard fieldbus interfaces 10a, 10b by means of a standard fieldbus 11. In the present case, this is an already "fully developed" communication system, present in series configuration, which now is to be provided with additional functions, with the condition that the existing communication relationships are not to be changed, which could have various development technology reasons. In this case, the communication system of the invention, having interface devices 5a and 5b and the additional data bus 4, can overlie the conventional communication system, whereby the requirement is met that peripheral devices 2a and 2b have the additional I/O interfaces 3a and 3b.

Interface device 5c in FIG. 3 connects a sensor 2c to data bus 4; interface device 2c therefore has a sensor interface as the peripheral device interface 6c; in the present case, this is a standardized sensor interface.

It is evident from the prior description that the shown interface devices 5a, 5b, and 5c can be used to connect a peripheral device 2a, 2b, and 2c in each case with an I/O interface 3a, 3b, 3c to a data bus 4. Interface device 5a, 5b, 5c in each case has a peripheral device interface 6a, 6b, 6c and a data bus interface 7a, 7b, 7c, whereby interface device 5a, 5b, 5c is configured so that interface device 5a, 5b, 5c can be connected by the peripheral device interface 6a, 6b, 6c thereof to a peripheral device 2a, 2b, 2c by means of the I/O interface 3a, 3b, 3c thereof and can exchange data with peripheral device 2a, 2b, 2c. Further, interface device 5a, 5b, 5c can be connected via the data bus interface 7a, 7b, 7c thereof to data bus 4 and can transmit and/or receive data via data bus 4, whereby a communication relationship KV can be implemented for this purpose in interface device 5a, 5b, 5c.

In FIGS. 1 through 4, peripheral device interfaces 6a, 6b are configured so that they can have access to I/O interfaces 3a, 3b, formed as debug interfaces, of peripheral devices 2a, 2b formed as control devices.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A communication system comprising:
at least two peripheral devices, each peripheral device having at least one I/O interface, and the two peripheral devices being connected to one another by at least one data bus and exchange data via a communication relationship via the data bus; and
at least one interface device having a peripheral device interface and a data bus interface,
wherein the interface device is connectable by the peripheral device interface to one of the peripheral devices by the I/O interface,
wherein the interface device is connectable by the data bus interface to the data bus, and
wherein the communication relationship is preset in the interface device with one or more memory locations of a connected peripheral device from which data is to be read and/or in which data is to be written.

2. The communication system according to claim 1, wherein the communication relationship is transmitted via the data bus interface and the data bus to the interface device.

3. The communication system according to claim 1, wherein the communication relationship is initially transmitted from a connected peripheral device via the peripheral device interface to the interface device outside of a data exchange between the peripheral devices.

4. The communication system according to claim 1, wherein the interface devices assure a data exchange between the peripheral devices, without another interconnection or connection of the configuration device.

5. The communication system according to claim 1, further comprising a configuration device with a data bus interface, the configuration device according to one or more preset communication relationships queries data via the data bus from the peripheral devices, at least partially, via the interface devices and outputs these data and/or calculated data according to the preset communication relationships via data bus to the peripheral devices.

6. The communication system according to claim 1, wherein the data bus is a standard fieldbus or an Ethernet-based fieldbus.

7. The communication system according to claim 1, wherein the peripheral device interface is a debug interface of a control device, particularly a JTAG, DAP, AUD, or Nexus interface.

8. The communication system according to claim 1, wherein the peripheral device interface allows access to an internal data bus of a control device.

9. The communication system according to claim 1, wherein the peripheral devices, at least partially, have an additional communication relationship with one another via an additional standard fieldbus interface via a standard fieldbus.

10. The communication system according to claim 1, wherein the interface device has a sensor interface and/or actuator interface.

11. An interface device for connecting at least one peripheral device with an I/O interface to a data bus, the interface device comprising:
a peripheral device interface;
a data bus interface, the interface device being configured such that the interface device is connectable via the peripheral device interface thereof to at least one peripheral device via the I/O interface thereof and exchanges data with the peripheral device, the interface device being connectable via the data bus interface thereof to the data bus to transmit and/or receive data via the data bus; and
at least one communication relationship that is preset in the interface device with one or more memory locations of a connected peripheral device from which data is to be read and/or in which data is to be written.

12. The interface device according to claim 11, wherein the peripheral device interface is configured such that a debug interface of a control device is accessed and/or an internal data bus of a control device is accessed.

13. The interface device according to claim 11, wherein the data bus interface is a standard fieldbus interface.

14. The interface device according to claim 11, wherein the communication relationship is further preset in the interface device with an address of at least one target peripheral device from which data are to be obtained via the data bus and/or to which data are to be transmitted via the data bus.

15. The communication system according to claim 1, wherein an XCP protocol (Universal Measurement and Calibration Protocol) is used for communication.

16. The communication system according to claim 10, wherein the interface device is a peripheral device interface.

17. The communication system according to claim 1, wherein the communication relationship is further preset in the interface device with an address of a target peripheral device from which data is to be obtained via the data bus and/or to which data is to be transmitted via the data bus.

18. The communication system according to claim 1, wherein the interface device is configured to request data from the one or more memory locations preset by the communication relationship, and to transmit the requested data on the data bus.

19. The communication system according to claim 18, wherein the interface device is configured to transmit the requested data on the data bus to a target peripheral device directly without intervention by an intermediary central computer.

20. The communication system according to claim 1, wherein the interface device is configured to obtain data from the data bus, and to instruct the connected peripheral device to store the obtained data in the one or more memory locations preset by the communication relationship.

* * * * *